(12) United States Patent
Geng et al.

(10) Patent No.: US 6,180,151 B1
(45) Date of Patent: Jan. 30, 2001

(54) LEAVENED DOUGH EXTRUSION PROCESS

(75) Inventors: Quinghuang Geng, Roseville; Susan M. Hayes-Jacobson, Minneapolis, both of MN (US)

(73) Assignee: The Pillsbury Company, Minneapolis, MN (US)

(*) Notice: Under 35 U.S.C. 154(b), the term of this patent shall be extended for 0 days.

(21) Appl. No.: 09/329,512

(22) Filed: Jun. 10, 1999

(51) Int. Cl.[7] .............................. A23B 4/03; A21D 10/00; A23L 2/40

(52) U.S. Cl. ....................... 426/448; 426/559; 426/561; 426/562

(58) Field of Search .................. 426/448, 559, 426/561, 562

(56) References Cited

U.S. PATENT DOCUMENTS

| | | |
|---|---|---|
| 3,554,762 | 1/1971 | Craig et al. ........................... 99/92 |
| 3,922,353 | 11/1975 | Bernatovicz . |
| 4,469,711 | 9/1984 | Seltzer ................................. 426/557 |
| 4,495,214 | 1/1985 | Seltzer et al. ......................... 426/557 |
| 4,741,907 | 5/1988 | Furuhashi ............................... 426/90 |
| 4,966,782 | 10/1990 | Heidolph et al. .................... 426/551 |
| 5,015,488 | 5/1991 | Van Lengerich et al. ........... 426/549 |
| 5,015,489 | 5/1991 | Van Lengerich et al. ........... 426/549 |
| 5,015,490 | 5/1991 | Van Lengerich et al. ........... 426/549 |
| 5,030,468 * | 7/1991 | Van Lengerich et al. ........... 426/549 |
| 5,035,904 | 7/1991 | Huang et al. ........................ 426/243 |
| 5,071,668 | 12/1991 | Van Lengerich et al. ........... 426/549 |
| 5,077,074 | 12/1991 | Van Lengerich ..................... 426/549 |
| 5,120,559 | 6/1992 | Rizvi et al. .......................... 426/446 |
| 5,194,271 | 3/1993 | Yasosky ................................. 426/92 |
| 5,225,226 | 7/1993 | Thomas et al. ...................... 426/561 |
| 5,385,746 * | 1/1995 | De Almeida ........................ 426/447 |
| 5,409,724 | 4/1995 | Heidolph et al. .................... 426/562 |
| 5,417,992 | 5/1995 | Rizvi et al. .......................... 426/283 |
| 5,520,937 | 5/1996 | Yasosky et al. ....................... 426/94 |
| 5,773,068 | 6/1998 | Heidolph et al. .................... 426/551 |

FOREIGN PATENT DOCUMENTS

| | | |
|---|---|---|
| 0 826 306 A1 | 3/1998 | (EP) . |
| 2 118 016 | 10/1983 | (GB) . |
| WO 97/25880 | 7/1997 | (WO) . |
| WO 98/05214 | 2/1998 | (WO) . |
| WO 99/02039 | 1/1999 | (WO) . |

* cited by examiner

*Primary Examiner*—Nina Bhat
(74) *Attorney, Agent, or Firm*—Faegre & Benson LLP

(57) ABSTRACT

A extrusion method is used to obtained leavened dough products with desirable characteristics. A chemical leavener is used to release carbon dioxide within the extruder and/or a premixer to yield an expanded dough following the extrusion process. The improved dough can be described by the degree of expansion and its cooking properties.

31 Claims, 7 Drawing Sheets

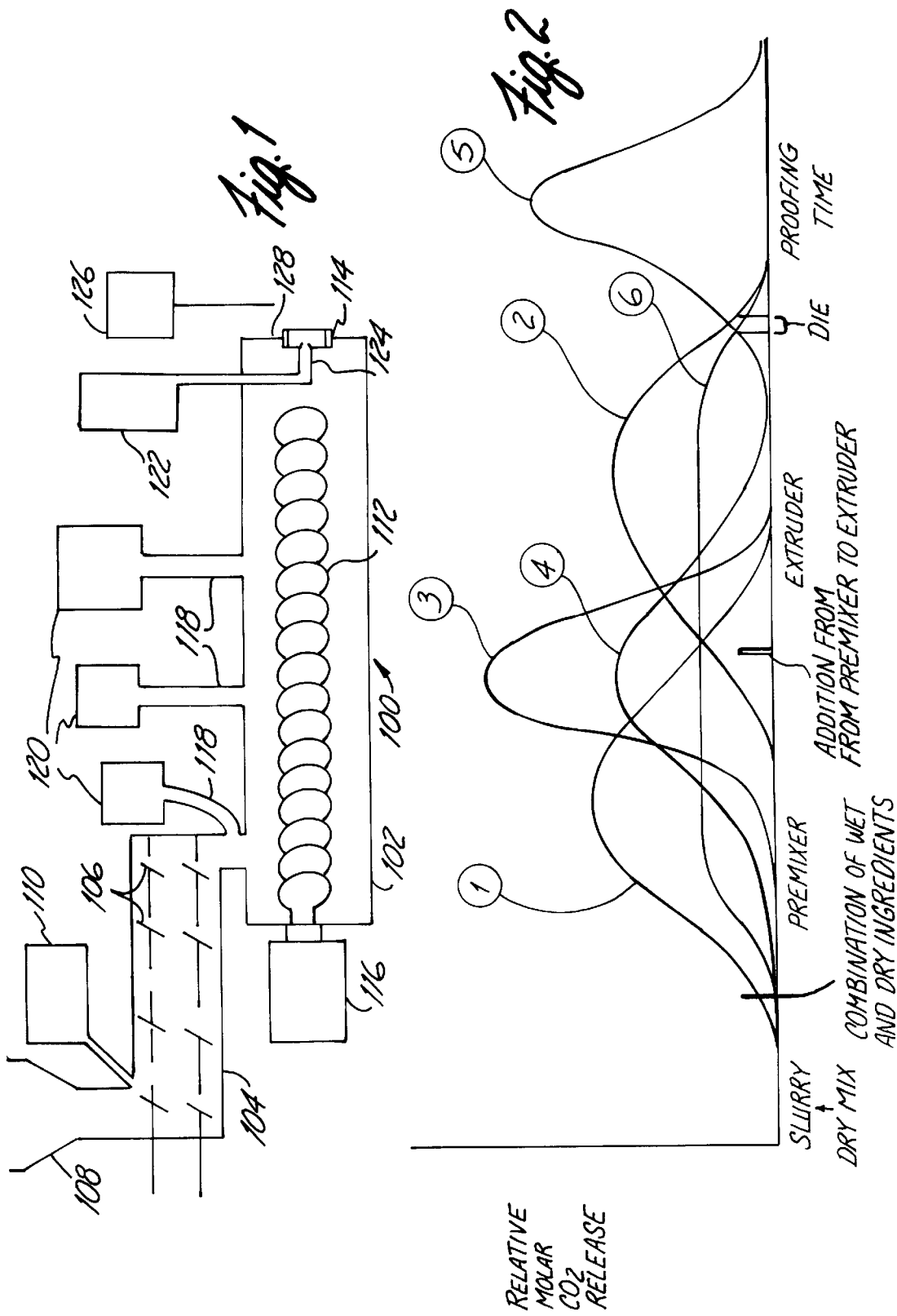

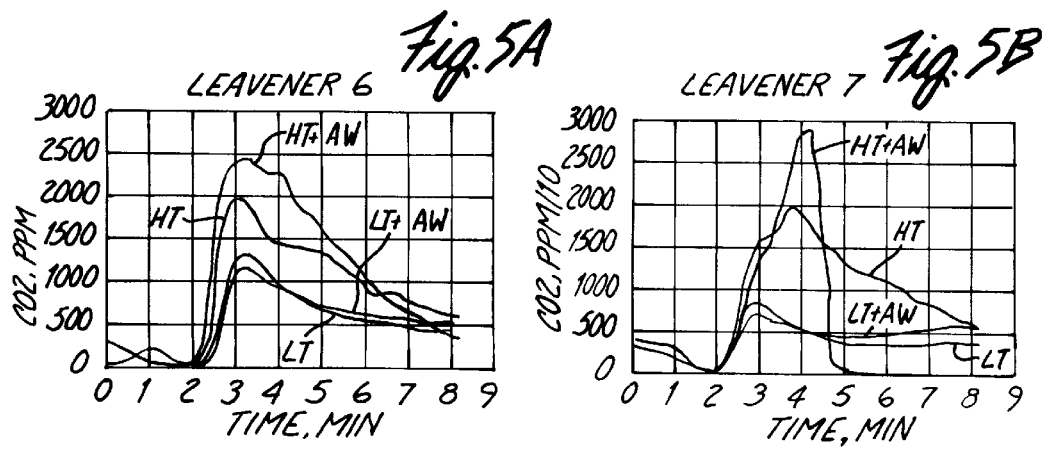
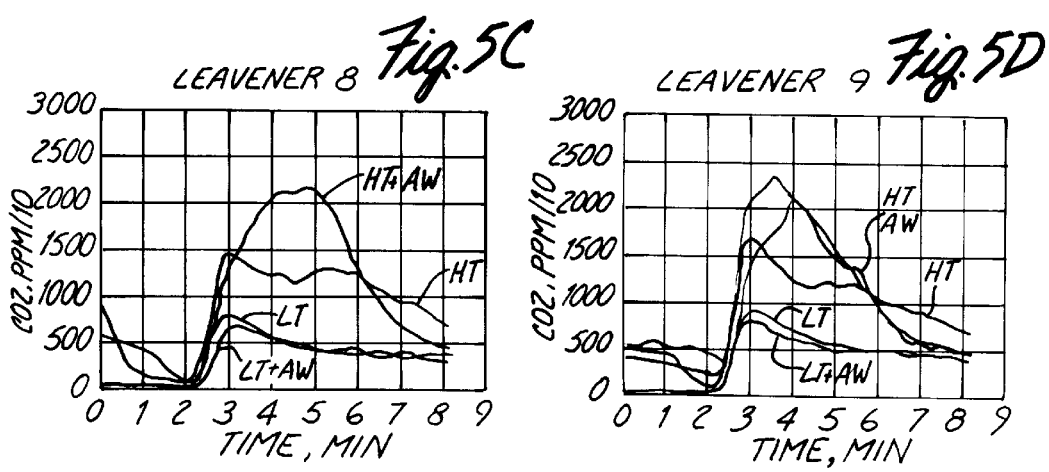
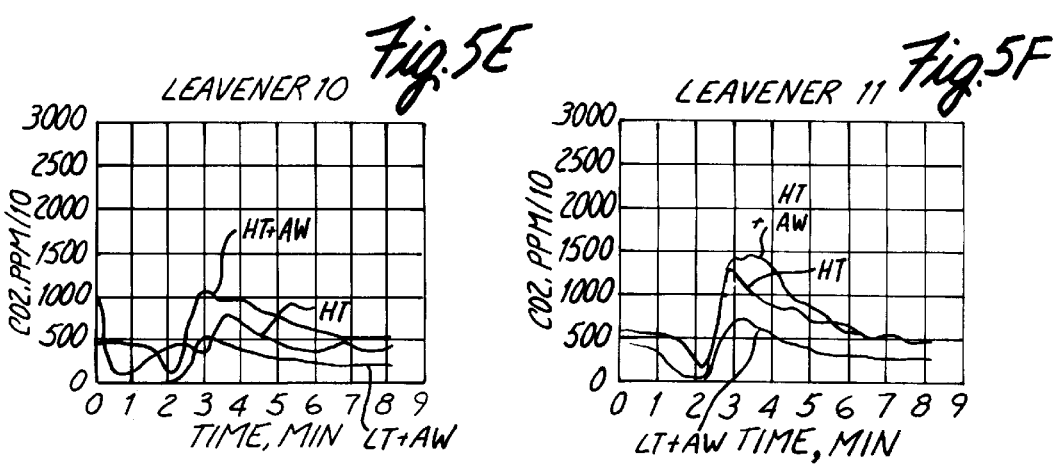

LEAVENED DOUGH EXTRUSION PROCESS

BACKGROUND OF THE INVENTION

The invention relates to an extrusion process for the formation of leavened dough products. The invention further relates to leavened dough products with improved characteristics.

Businesses involved in commercial food production and distribution generally must use efficient production processes to provide food at a reasonable cost. In addition, these businesses consider the food characteristics such that the food is desirable to a significant number of consumers. While consumers desire food with appealing taste and texture, they also demand food products that are simple and fast to prepare.

Extrusion processes for the formation of food products offer an efficient and cost effective approach for the formation of both cooked (hot extrusion) and raw (cold extrusion) food products. Raw extruded food products may be subsequently cooked following extrusion. Traditional products produced by cold extrusion include, for example, pasta. Extrusion processes, however, necessarily have certain characteristics that suggest the types of products that can be effectively produced by way of extrusion. In particular, extrusion processes push the ingredients, often under significant pressure, while moving the food product up to and through a die. Thus, extrusion processes are particularly suitable for the processing of dense products. Because of high pressures in the extrusion process, extrusion generally is not suitable for the production of less dense, breadier doughs. These products generally are most successfully prepared by conventional cooking approaches such as boiling, baking and frying.

With respect to approaches for preparing food, microwave reheating is an approach that is desirable to consumers because of its speed and convenience. However, reheating of products in a microwave oven can result in alteration of the texture of the product relative to the texture produced by conventional cooking and heating approaches. In particular, dough products generally experience altered texture upon microwave reheating.

SUMMARY OF THE INVENTION

In a first aspect, the invention pertains to a method of forming a leavened dough product comprising extruding a mixture including flour, water and chemical leavener, the chemical leavener comprising a leavening acid and a salt having an anion selected from the group consisting of carbonate and bicarbonate, the extrusion temperature being less than about 145° F. (62.8° C.), the chemical leavener releasing sufficient carbon dioxide from the formation of the mixture through the extrusion to decrease the density of the extruded dough by at least about 5 percent relative to the corresponding extruded dough without the chemical leavener.

In a further aspect, the invention pertains to a method of forming a leavened dough product comprising extruding a mixture comprising flour, water and chemical leavener, the leavener comprising a leavening acid and a salt having an anion selected from the group consisting of carbonate and bicarbonate, the extrusion temperature being less than about 145° F. (62.8° C.), the extruded uncooked dough having a density less than about 1.12 g/cc.

In another aspect, the invention pertains to a method of forming a leavened dough product, the method comprising:

forming a mixture comprising flour and a chemical leavener, the leavener comprising a leavening acid and a salt having an anion selected from the group consisting of carbonate and bicarbonate;

combining the mixture with an aqueous liquid to form a premix; and extruding the premix to form a dough product.

In addition, the invention pertains to a fried filled food product comprising a filling having a water activity greater than about 0.9, the food product having a dough around the filling with an inner, dense high moisture layer that extends through no more than about 25 percent of the thickness of the cooked dough.

In a further aspect, the invention pertains to a cooked filled dough product which is capable of withstanding reheating in a microwave oven without the cooked dough portion significantly changing its texture, wherein the cooked dough portion of the dough product comprises a by product of a leavening acid and a soda. Unleavened extruded dough products upon microwave reheating become tougher and chewier and have a more leathery texture.

Moreover, the invention pertains to a cooked filled dough product wherein the filling has a water activity greater than about 0.9, the cooked filled dough product being capable of withstanding a freeze thaw cycle without exhibiting a significant change in its texture. After a freeze thaw cycle, unleavened extruded filled dough products lose rigidity and structural integrity, and become soggy.

BRIEF DESCRIPTION OF THE DRAWINGS

FIG. 1 is a schematic, sectional view of an extrusion apparatus with an optional premixer, where the cross section is taken through the center of the apparatus.

FIG. 2 is a schematic plot of hypothetical profiles of carbon dioxide generation within a dough during an extrusion process.

FIGS. 5(A–F) is a set of plots of carbon dioxide release from a mixed dough product. Panels A–F correspond to leaveners with different leavening acids in combination with sodium bicarbonate.

DETAILED DESCRIPTION OF THE PREFERRED EMBODIMENTS

Figure 3:
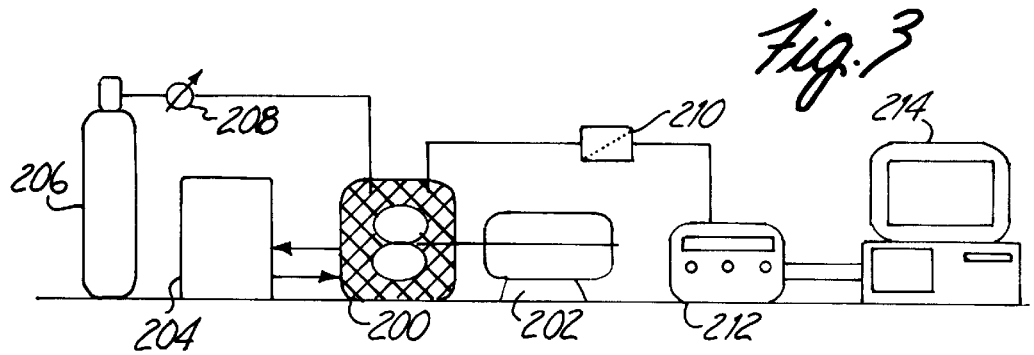
FIG. 3 is a schematic layout of a mixer with a carbon dioxide detector for the measurement of carbon dioxide release profile during dough mixing.
Figure 4A:
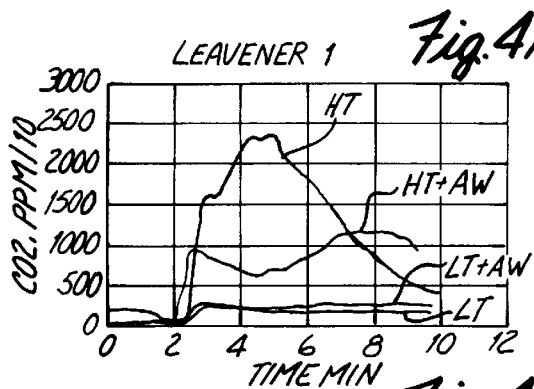
FIGS. 4(A–E) is a set of plots of carbon dioxide release from a mixed dough product. Panels A–E correspond to different leaveners comprising encapsulated soda.
Figure 4B:
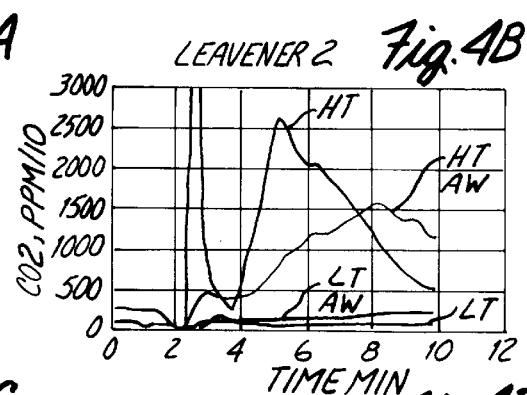
Figure 4C:
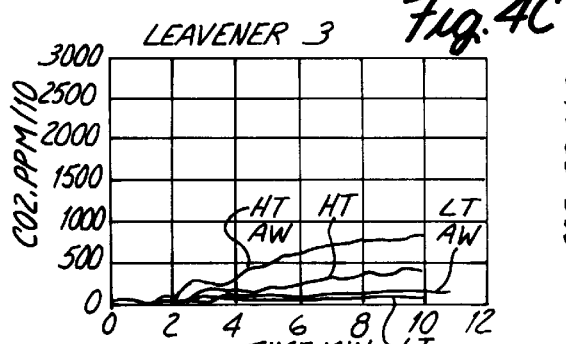
Figure 4D:
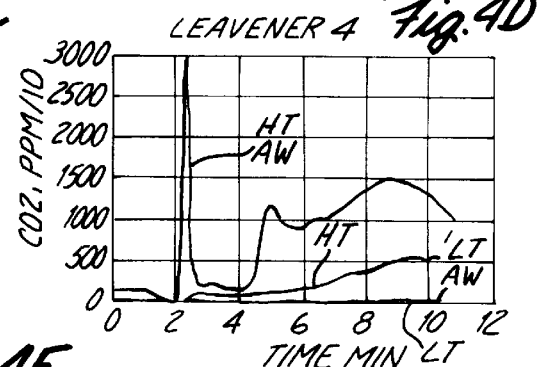
Figure 4E:
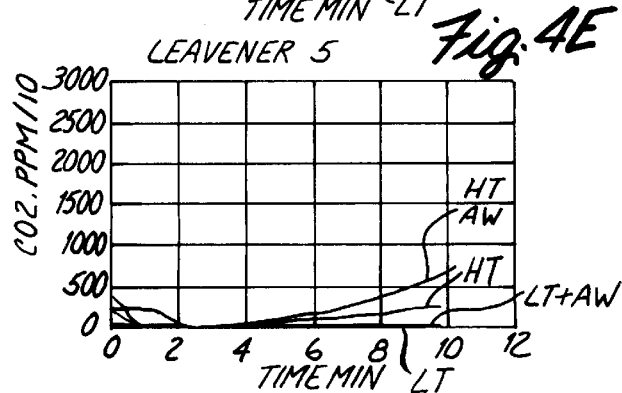
Figure 6A:
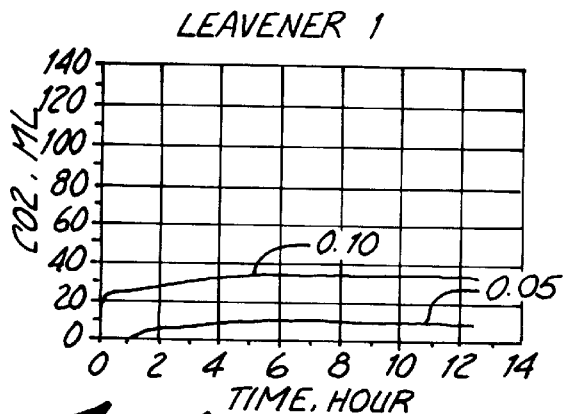
FIGS. 6(A–C and D,E) is a set of plots of cumulative carbon dioxide release from dough following extrusion. Panels A–E correspond to different leaveners.
Figure 6D:
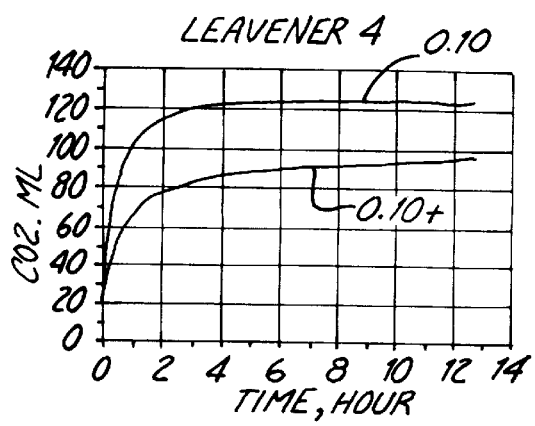
Figure 6B:
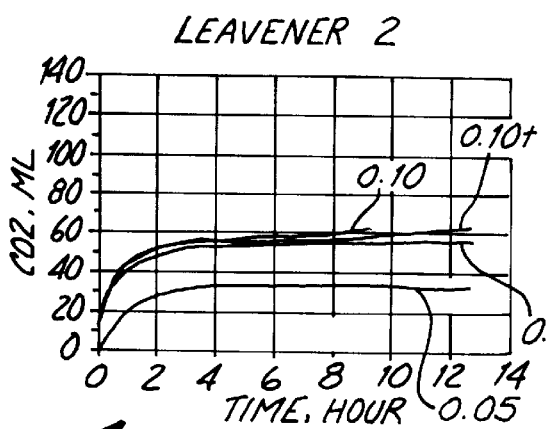
Figure 6E:
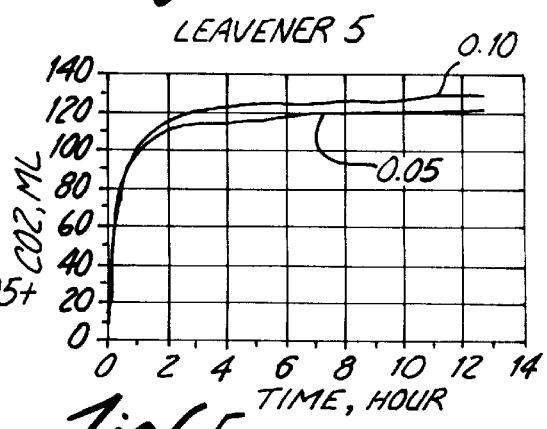
Figure 6C:
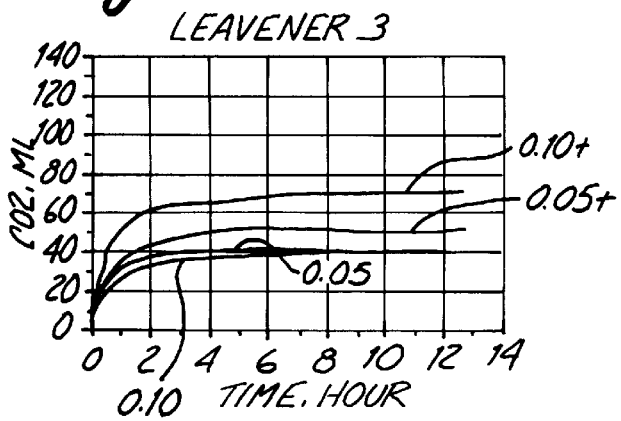

It has been discovered that an appropriately selected leavening system releases its carbon dioxide over suitable time periods to produce extruded dough products with desirable dough characteristics. The extrusion is performed at temperatures that do not cook or gelatinize the starch within the dough. The leavening agent includes a combination of a soda, i.e., carbonate or bicarbonate salt, and a food/leavening acid. The dough products can be filled or unfilled. Some of the dough products have improved characteristics. In particular, products can be formed that have a desirable texture following microwave reheating. Also, preferred filled dough products can be fried with uniform cooking through the dough.

With properly selected ingredients, extruded filled food products have a tender dough, for example, that is fried or baked following extrusion and that can approximate the texture of, for example, a pie crust following microwave reheating. Also, the improved, extruded dough product has better freeze/thaw stability for filled dough products with high water activity fillings. The doughs are tender enough that they can be eaten comfortably following thawing of a cooked dough product without reheating. Furthermore, preferred leavened doughs surprisingly maintain their tenderness following reheating in a microwave. The extrusion processes described herein are an extremely efficient and cost effective approach to the production of a variety of dough products.

The extrusion can be performed with a variety of different extrusion apparatuses. In some embodiments, the dough ingredients are mixed, preferably continuously, in a premixer as they are fed into the chamber of an extruder. The leaveners may be mixed with the dry ingredients prior to combining the dry ingredients with liquids within a premixer or in the extruder barrel. As the dough moves through the extruder toward a die, the ingredients can be further mixed if the extruder is a twin screw extruder or the like. If a twin screw extruder is used the wet and dry ingredients can be mixed directly within the extruder barrel. Preferably, a majority of the leavening process occurs within the extruder. Leavening results from the release of gaseous carbon dioxide ($CO_2$). The extruder forces the dough through a die, which shapes the dough into a corresponding form. The extrusion is a "cold" extrusion, performed at temperatures less than about 145° F. such that the starch does not begin to gelatinize.

The approaches described herein are suitable for the formation of a variety of leavened food products. In particular, a variety of unfilled dough products, such as bread sticks, biscuits, muffins and the like can be made. Similarly, a variety of filled dough products, such as Pizza Rolls® brand of snacks, can be formed that can have a variety of dough textures following cooking. Following extrusion the raw dough product can be cooked, such as by frying, boiling, baking or microwave cooking. The dough can be refrigerated or frozen before or after cooking, if desired.

Chemical leavening agents are used to produce the leavening in the dough. In particular, the leavening agents include a carbonate or bicarbonate salt or salts and a leavening acid or acids. The characteristics of the soda and acid combination provide for the production of food products with varying textures of the dough. Specifically, the time evolution of both the dough pH and the carbon dioxide production as the dough progresses through the mixing and extrusion process alter the properties of the resulting dough during development in the extruder. Thus, the conditions in the mixing and extrusion process can be altered to yield a dough that has varying degrees of tenderness and various surface appearances following cooking and with or without microwave reheating, as described further below. While the tenderness of the dough can be varied, preferred doughs are still more tender than corresponding unleavened doughs.

If a premixing step is used, a portion of the carbon dioxide can be produced within the premixer. In preferred embodiments, most or all of the carbon dioxide is produced within the extruder and/or a premixer, if used. If the carbon dioxide is produced too early, such as prior to combining the wet and dry ingredients, the gas would tend to escape prior to the formation of the dough premix. Any gas that escapes from, for example, a wet slurry comprising chemical leaveners before it is combined with dry ingredients does not contribute to the leavening of the resulting extruded dough product. A portion of the carbon dioxide can be released at the die or following extrusion, either before or during cooking. In alternative embodiments, all of the carbon dioxide can be released following extrusion.

In the process of the present invention, products are produced that are not as dense as corresponding extruded doughs without chemical leaveners. It has been observed that the flow rates through the extruder, for leavened dough products releasing carbon dioxide within the extruder, tend to be somewhat slower than the rates for corresponding unleavened dough compositions. Many factors can affect the passage of dough or dough precursor through an extruder, such as viscosity, slip, temperature, dough moisture, fat level and the development level of the dough. An extruded, unleavened dough is dense and relatively incompressible because of the density.

Conversely, the present leavened doughs possess many tiny bubbles such that the dough is compressible, somewhat similar to a sponge. While not wishing to be bound by theory, it is believed that the presence of the bubbles, which hold gas during the extrusion process, tends to cause the material to move through the system somewhat more slowly than unleavened dough. Furthermore, the presence of the gas bubbles evidently reduces compaction of the dough from pressure within the extruder and makes the dough more elastic such that the density of the extruded dough is significantly reduced relative to extruded, unleavened dough products. The result is a dough with a fluffier texture.

The effects of a chemical leavening agent can be approximated by injection of supercritical carbon dioxide into a dough product during extrusion. Injected supercritical carbon dioxide, though, does not result in all of the desirable features of the extruded dough product that can be achieved with the chemical leavening agents. Furthermore, the use of supercritical carbon dioxide does not have the inherent flexibility of obtaining selectable dough characteristics that is obtainable with chemical leavening agents, as described herein. The use of extrusion with super critical carbon dioxide is described further in U.S. Pat. No. 5,417,992, entitled "Supercritical Fluid Extrusion Process and Apparatus," and U.S. Pat. No. 5,120,559, entitled "Extrusion Process With Supercritical Fluids," both of which are incorporated herein by reference.

Food Extruders

The dough processing approaches herein are based on extrusion of the dough. The dough ingredients are introduced into the extruder in varying degrees of hydration. The dough generally forms upon completion of the hydration of the dry dough ingredients within the extruder. An extrusion process involves the application of pressure against the dough product to force the dough along within the extruder barrel and through a die.

Extruders generally involve one or more screws that are rotated to propel the dough toward the die. The extruder can include sections with multiple screws and other sections with a single screw. If there is more than one screw, rotation of the screws mixes the dough as well as propels the dough forward. Generally, the screw is surrounded by a barrel that holds the dough under pressure as it moves toward the die. The extruder does not necessarily need a screw, and other implements such as paddles can be used to move the dough and to force the dough through the die under pressure.

Referring to FIG. 1, an embodiment of a food extruder 100 is depicted schematically. The dough materials are supplied into extruder barrel 102 from premixer 104. A premixer is optional since a multiple screw extruder can mix the dough ingredients within extruder barrel 102. Premixer 104 generally mixes dry and wet ingredients and delivers the mixture into extrusion barrel 102 preferably in about five minutes or less following mixing. Premixer 104 generally includes a plurality of paddles 106 to mix the ingredients. Dry ingredients are added from hopper 108, and wet ingredients are added from tank 110. Premixer 104 generally delivers the dough at or near one end of extruder barrel 102.

A screw drive 112 is located within extrusion chamber 102 to propel the dough mass through extrusion chamber 102 to die 114. Screw 112 is rotated by motor 116. The rotation speed of the screw(s) correlate with the retention time of the dough within extruder barrel 102. Screw 112 can include a single screw or the like, or multiple screws. The extruder can have a section with multiple screws that feeds into a section with a single screw, with or without a premixer. Additional ingredients can be added through optional ducts 118 from tanks 120.

Extruder 100 can optionally include a filling depositor 122. Filling depositor 122 generally includes a tubular outlet 124 from which the filling is expelled inside of die 114. Cutter 126 can be used to cut the dough pieces into a desired size and/or shape.

Conventional food extruders can be used to extrude the doughs with desired leavening agents. Conventional single screw food extruders generally are used to extrude compressed dough products, such as pasta products, since pressure within the extruder tends to compress the dough. Twin screw extruders generally are used with products with multiple components that need to remain mixed during the extrusion process. Traditionally, single screw extruders are used for cold extrusion of, for example, pasta, such that the product is not cooked during the extrusion. Traditionally, twin screw extruders are used for hot extrusions such that the product is, at least, partially cooked during the extrusion process. In contrast, twin screw extruders used in the improved processes described herein involve a cold extrusion that does not cook the dough.

Die 114 is an orifice at extruder head 128 through which the dough is forced under pressure. The die opening can be selected to produce the desired shape of dough product. The dough with the selected shape can then be cut into individual units. If the dough product is intended to have a filling, the filling can be dispensed from tube 124 within extruder 100 at die 114 such that the dough forms around the filling as the filling flows from tube 124. The filling surrounded by the dough is extruded through die 114. Once extruded, the filling encircled by dough can be cut, and the ends of the cut pieces can be sealed to form the completed product.

If desired, the filling can be incorporated following the extrusion process. For example, the dough can be extruded as sheets that are subsequently wrapped around a portion of filling. Other suitable approaches can be used to wrap the dough around a filling following the extrusion.

Depending on the properties of the leavening agents, carbon dioxide can be released at various stages within the extruder/premixer. Generally, the dough moves through the extruder in about ten minutes or less, although this period can be adjusted, as desired. The extruder screw speed can be adjusted to yield a desired throughput and retention time within the extruder. The properties of the leavener, as described further below, can be selected along with the extrusion parameters, such as temperature, moisture, pH and residence time, to yield a desired carbon dioxide release profile within the extruder.

Dough Composition

The dough minimally includes flour, water and leavener. Other ingredients can be included in the dough, such as oils, salt, sweeteners, emulsifiers, other flavorings and the like. Suitable flours include glutinous flours, nonglutenous flours and combinations thereof. If nonglutenous flour is used, a sufficient amount of glutinous flour, gluten, and/or gluten-by-products generally is included in the dough to form a stable dough structure. Preferred flours include, for example, wheat, corn, rye, barley, oats, sorghum and triticale. The flours can be whole grain flours, flours with the bran and/or the germ removed, or combinations thereof. Generally, the dough includes at least about 35 percent by weight flour, preferably from about 40 percent to about 80 percent by weight flour, and more preferably from about 50 percent to about 70 percent by weight flour.

The dough generally includes less than about 10 percent by weight leavener components, preferably between about 0.1 percent by weight and 6 percent by weight, and more preferably between about 0.4 percent by weight and about 5 percent by weight. The leavener quantities include only active leavener compositions. Active leavener compositions do not include encapsulation ingredients, fillers and the like that may physically be delivered with the leavener but do not contribute to the leavening effect. Aqueous liquid, i.e., liquid containing water, can be added, for example, as tap water and/or in the form of other liquids containing water, such as corn syrup. Generally, the dough includes greater than about 15 percent by weight water, and preferably from about 18 percent to about 45 percent by weight water. The amount of water in the dough affects the leavening process, as described further below.

The leavener includes a carbonate and/or bicarbonate salt and a leavening/food acid. Suitable carbonate and bicarbonate salts include, for example, sodium carbonate, potassium carbonate, sodium bicarbonate, potassium bicarbonate, ammonium bicarbonate and mixtures thereof. A variety of leavening acids are suitable, including conventional leavening acids known in the industry. Suitable leavening acids include, for example, citric acid, sodium acid pyrophosphate (SAPP), sodium aluminum phosphate (SALP), monocalcium phosphate (MCP), dicalcium phosphate (DCP), sodium aluminum sulfate (SAS), anhydrous monocalcium phosphate (AMCP), dimagnesium phosphate (DMP), dicalcium phosphate dihydrate (DCPD), glucono delta lactone (GDL) and mixtures thereof. Following completion of the leavening process, the anion of the leavening acid and the cation of the soda generally remain in the dough as a by product of the chemical leavener.

Generally, the speed of carbon dioxide release is determined by the rate that the leavening agents are decomposed and neutralized in the presence of moisture at the temperature of the dough. The speed of the leavening system can be selected to yield a desired carbon dioxide release profile for a particular residence time within the extruder, under selected moisture and temperature conditions. For example, SAPP28 and SAPP 40, which are formulated to have different decomposition rates, may be used with carbonate and/or bicarbonate salt to achieve different carbon dioxide release patterns. In some preferred embodiments, a mixture of leavening acids is used to obtain carbon dioxide release more uniformly through the extrusion process.

Either the leavening acid or the carbonate/bicarbonate salt can be encapsulated to slow their hydration and, thus, to obtain carbon dioxide release in a desired time frame. Suitable encapsulated soda can be obtained, for example, from Balchem Corp. (Slate Hill, N.Y.) having a coating with a melting point of about 110° F. (43.3° C.). Preferred characteristics of pH and solubility are described further below in the context of the extrusion process.

The relative amounts of carbonate and/or bicarbonate salt and leavening acid depend on the desired amounts of carbon dioxide production and pH of the dough. To maximize carbon dioxide production, sufficient acid is added to supply hydrogen ions to the carbonate or bicarbonate anions to form carbonic acid, which subsequently forms carbon dioxide with the release of a water molecule. The use of excess acid produces a lower pH during and following extrusion. The use of excess base/soda produces a higher pH during and following extrusion.

The dough, optionally, can include fat components. Preferred fat ingredients include, for example, oils and shortenings. Suitable oils include, for example, soy bean oil, corn oil, canola oil, sunflower oil and other vegetable oils. Suitable shortenings include, for example, animal fats and hydrogenated vegetable oils. In preferred embodiments, the dough includes no more than about 35 percent by weight fat and more preferably from about 1 percent by weight to about 30 percent by weight fat.

Furthermore, the dough can include, optionally, a sweetener and/or artificial sweetener. Suitable sweeteners include dry sweeteners and liquid sweeteners. Suitable dry sweeteners include, for example, lactose, sucrose, fructose, dextrose, maltose, corresponding sugar alcohols, and mixtures thereof. Suitable liquid sweeteners include, for example, corn syrup, malt and hydrolyzed corn syrup. In preferred embodiments, the dough includes from about 1 percent by weight sweetener to about 40 percent by weight sweetener.

The dough can further include additional flavorings including, for example, salt, such as sodium chloride and potassium chloride, milk and milk products, eggs and egg products, whey, malt, yeast extract, inactivated yeast, spices and vanilla. The additional flavoring preferably comprises from about 0.1 percent and about 20 percent by weight of the dough, and more preferably from about 0.5 percent and about 10 percent by weight of the dough. Similarly, the dough can include particulate ingredients intermixed in the dough, such as nuts, flavor chips, seeds and the like. If the dough includes particulate ingredients, the dough preferably has from about 1 percent to about 20 percent by weight particulate ingredients.

Besides the flavorings described above, the dough can further include preservatives, emulsifiers and conditioners. Suitable preservatives include, for example anti-oxidants such as BHT. Suitable emulsifiers include, for example, mono- and diglycerides of fatty acids, propylene glycol mono- and diesters of fatty acids, glycerol-lacto esters of fatty acids, ethoxylated mono- and diglycerides, lethicin protein, and mixtures thereof. Preferred emulsifiers include mono- and di-glycerides and mixtures of propylene glycol mono- and diesters of fatty acids, mono- and diglycerides and lethicin. Suitable conditioners assist with dough relaxation, which include, for example, potassium sulfate, L-cystine and sodium bisulfate. Preservatives, emulsifiers and conditioners comprise combined preferably less than about 5 percent by weight of the dough, and each preferably between about 0.1 percent and about 2.5 percent by weight of the dough.

Preferably, the leavener is mixed with the flour to form a flour blend prior to mixing with liquid ingredients to prevent significant release of the carbon dioxide prior to addition of the dough premix into the extruder. Generally, the flour blend can be formed a significant period of time, at least months, prior to use, if properly stored. Additional dry ingredients can be mixed into the flour blend, if desired. Alternatively, the leavener can be added to liquid ingredients shortly prior to combining the liquid ingredients and the flour, especially if one or more leavening components are encapsulated to slow hydration. Furthermore, the leavener, flour and water can be combined effectively simultaneously, i.e., without significantly mixing any two ingredients prior to combining the components. For example, the leaveners and the flour can be separately metered into a premixer prior to addition of liquid ingredients. In principle, the flour and liquid ingredients can be mixed somewhat prior to the addition of the leavener, but it generally is difficult to properly mix the leavener uniformly into the premix if the flour and liquid ingredients are already significantly mixed.

In certain embodiments, a dough premix is initially formed in the premixer. Preferably, the premixer combines the flour blend and a liquid component to form a premix, where the residence time in the premixer preferably is less than about 8 minutes, more preferably less than about 6 minutes, and even more preferably between about 30 seconds and about 5 minutes. Preferably, the premixer continuously feeds the premix into the extrusion barrel. The premix is a hydrating flour mixture that generally is not developed sufficiently to form a cohesive dough, and may have the form of pellets that combine into the dough upon further hydration and development. If a multiple screw extruder is used for the extrusion, additional mixing of the dough with or without addition of further ingredients can take place within the extruder.

Extrusion Process

In preferred embodiments, significant amounts of the carbon dioxide released by the leavening acid and carbonate and/or bicarbonate salts are released within the extruder barrel and/or within a premixer. The timing of the carbon dioxide release can be varied to alter the ultimate properties of the dough. The ultimate properties of the dough also depend on the pH of the dough during the periods of carbon dioxide release. Thus, the selection of the leavening agent and the speed of the extrusion process interact to provide a selectable range of properties for the final dough product.

The resulting leavened dough following extrusion has a cellular structure corresponding to a partly developed gluten network surrounding bubbles/voids. The bubbles are formed by released carbon dioxide from the leavener. The developing gluten protein network provides an elastic structure that confines the carbon dioxide sufficiently to provide for bubble expansion within the dough.

The size and distribution of the cells depend on the timing of the carbon dioxide release. Since the dough is under pressure within the extruder, earlier release of the carbon dioxide tends to favor a dough with fewer but larger cells. As dough further develops following cell formation, cells tend to coalesce into larger cells. Bigger cells tend to result in a somewhat tougher dough product.

The expanded dough following extrusion has a lower density as a result of cell formation within the dough. This can be a desirable characteristic for many applications. In preferred embodiments, the extruded dough has a density less than about 1.12 grams/cm$^3$ (g/cc) and preferably less than about 1.05 g/cc, and more preferably from about 0.5 to about 1.0 g/cc, compared with an unleavened dough density generally of about 1.25 g/cc.

When fried, filled unleavened dough cooks such that the outer portion releases moisture while moisture gets trapped within a significant inner portion of the dough thickness. A thick inner portion of the cooked dough remains wet and very dense. The thick inner dough layer has a gummy consistency, and forms a gummy layer surrounded by a crispy layer of fried dough.

In contrast, leavened dough fries evenly to a very tender dough even if relatively thick, if preferred leaveners are used. After frying, the leavened dough has a much thinner or minimal inner gummy layer, even if filled with a high water activity filling. Following frying, a leavened dough filled with a high water activity filling preferably has a gummy layer that is less than about 25 percent of the thickness of the cooked dough and preferably less than about 15 percent of the thickness of the cooked dough.

Because of the lower densities and improved heat and moisture transfer, leavened dough can be extruded to have a greater thickness when forming a filled dough product, if desired, without adversely affecting the cooking properties. In preferred embodiments, the dough can be more than twice as thick, yet the dough fries considerably more evenly than a comparable, but thinner, unleavened dough. Generally, the extruded dough has a thickness greater than about 0.03 inch. Because of the improved cooking properties, the raw dough of a filled dough product can have a thickness greater than about 0.08 inch and in some preferred embodiments can be as large as about 0.25 inch. Following cooking, the cooked dough preferably has a thickness greater than about 0.045 inch.

Also, following frying, a conventional, unleavened extruded dough generally has surface blisters. The surface blisters are believed to result from the trapping of steam within the dough due to a lack of surface porosity. Blisters are formed when a volume of steam is trapped in the dough such that sheets of dough around the trapped steam cook separately. The steam later escapes, but an expanded section of cooked dough laying over a separate sheet of cooked dough causes a visible bubble on the surface of the cooked dough product.

Generally, the more developed the dough the greater the number and/or size of surface blisters. However, in the leavened dough products described herein, the number of surface blisters is influenced by the timing of the carbon dioxide release and the pH of the dough during the extrusion process. In particular, a higher water content in the dough, more mixing, early $CO_2$ release and/or a more acidic pH, i.e., lower pH, during the earlier portions of the extrusion process tend to enhance surface blister formation. Conversely, a lower water content or a higher pH during the earlier portions of the extrusion process tend to result in less surface blister formation. More surface blisters tends to result in a tougher dough for a similar number and size of cells within the dough mass.

Filled leavened dough products described herein can be produced with few or no surface blisters. If any surface blisters form with the leavened dough products, the surface blisters are significantly smaller than those observed with unleavened dough products. Therefore, the leavened dough products are more visibly attractive and more tender following frying. In preferred embodiments, the leavened dough products filled with a high water activity filling, after frying, do not have any blisters with a diameter greater than about 4 mm and preferably none greater than about 3 mm. The diameter of a blister is measured as the maximum length from edge to edge of the blister through the approximate center of the blister.

As noted above, at least a significant portion of the carbon dioxide preferably is released within a premixer and/or extruder barrel. Since the timing of the carbon dioxide production generally is controlled to produce a dough product with desired properties, the initial mixing preferably is performed such that a significant portion of the leaveners have not released carbon dioxide prior to combining the wet and dry ingredients. In preferred embodiments, the leaveners are mixed with other dry ingredients such that the leaveners are not hydrated until the wet and dry ingredients are combined. This can be accomplished by mixing the wet and dry ingredients within a premixer or directly within the extruder barrel.

In principle, encapsulated leaveners can be mixed with liquid ingredients to form a slurry that is subsequently mixed with dry ingredients. Unless this addition of the leaveners to a slurry is done in a controlled fashion shortly before addition to the dry ingredients, the amount of carbon dioxide released in the slurry, which is unavailable to leaven the dough, depends on the age of the slurry. Generally, less than about 85 mole percent of the carbon dioxide is released prior to combining the wet and dry dough ingredients. Preferably, less than about 50 mole percent of the carbon dioxide and more preferably less than about 20 mole percent of the carbon dioxide is released prior to combining the wet and dry dough ingredients since the carbon dioxide released in a wet slurry is not available to expand the dough.

If the amount of carbon dioxide released after the combination of the wet and dry ingredients varies with the age of the slurry, the degree of expansion of the resulting dough will correspondingly vary, and the corresponding products will not have consistent characteristics. Furthermore, if a majority of the carbon dioxide is released in the slurry prior to combining the wet and dry ingredients, a large amount of leaveners will be needed to produce a desired amount of dough expansion. The use of a large amount of leaveners may adversely effect the taste and color of the product.

In preferred embodiments, greater than about 10 mole percent of the carbon dioxide is released in the premixer (if used) and extruder, preferably greater than about 50 mole percent and more preferably greater than about 75 mole percent of the carbon dioxide is released in the premixer (if used) and extruder. Generally, to obtain a preferred expanded dough product, at least about 5 mole percent of the carbon dioxide is released in the extruder, preferably at least about 10 mole percent and more preferably at least about 15 mole percent of the carbon dioxide is released in the extruder. With respect to volumes, at least about 5 ml and more preferably at least about 10 ml of carbon dioxide per 100 grams dough is released within the extruder. If a premixer is used, at least about 25 ml and preferably 35 ml of carbon dioxide per 100 grams dough is released with the premixer.

Furthermore, in other embodiments, some or all of the carbon dioxide is released following completion of the extrusion process, i.e., following passage of the dough through the die. To obtain expanded dough if most or all of the carbon dioxide is released following extrusion, the dough is proofed for greater than about 5 minutes and more preferably for greater than about 10 minutes. A dough with significant volumes of the carbon dioxide released in a proofing step following extrusion can exhibit the improved tenderness and better frying properties observed in doughs expanded in the extrusion process. If the dough is cooked without proofing the dough significantly following extrusion, the availability of additional chemical leaveners within the dough following extrusion cannot effectively expand the dough.

The carbon dioxide release can be expressed by a plot of carbon dioxide release as a function of time, i.e., a time progression profile of the dough through the extrusion process from the formation of a premix until the dough reaches the die. The position of the center of the peak and the width of the peak depend on the solubility of the leavening components, the chemical nature of the leavening components, the water content of the dough, the temperature and the pH of the dough.

Referring to FIG. 2, six representative profiles are depicted schematically. Curve 1 is representative of early carbon dioxide release within the premixer, and partially within the slurry and the extruder. A carbon dioxide release profile as shown in curve 1 can result from a dough having highly soluble leavening agents and/or a high water content, where the chemical leaveners are added to an aqueous slurry just before the slurry is combined with the dry ingredients. A profile as shown in Curve 1 of FIG. 2 generally results in a dough with a smaller number of larger gas cells, a relatively tough dough and a moderate number of surface blisters. The profile represented by curve 2 corresponds with relatively late release of carbon dioxide due to less solubility of the leavening compounds, either leavening acid or soda. The sample corresponding to curve 2 generally would result in a dough following extrusion with a large number of small cells within the dough with low to moderate surface blistering. Thus, the sample producing curve 2 would yield a tender dough.

Curves 3 and 4 represent intermediate release of carbon dioxide within the premixer and extruder. The samples corresponding to curves 3 and 4 generally would have intermediate numbers and sizes of cells within the leavened dough following extrusion. Curve 4 has a broader profile relative to curve 3, which can result from a more uniform release of leaveners in the sample corresponding to curve 4 relative to the sample corresponding to curve 3. Curve 5 corresponds to a sample that releases most of the carbon dioxide following extrusion. The dough would have a large number of smaller cells and a low density, assuming that the dough is sufficiently extensible.

In some preferred embodiments, a mixture of leavening acids is used to combine the properties of the individual leavening acids. If a set of leavening acids is combined with different solubility properties, one obtains carbon dioxide production over more extended periods of the extrusion. A representative curve for mixtures of leavening acids is shown in FIG. 2 as curve 6. To describe these preferred mixed leavener embodiments, the total time within the premixer and extrusion barrel can be divided into four equal quartile segments. In these preferred embodiments, at least about 10 mole percent of the carbon dioxide and more preferably at least about 20 mole percent of the carbon dioxide is released within at least three separate time quartiles. The composition of a desirable mixture of leavening acids will depend on the particular extruder and dough characteristics.

The details of the extrusion process generally will depend on the particular features of the extrusion apparatus. Particular extrusion parameters suitable for the processes described herein are specified in detail in the examples below for a pilot scale extruder. For any selected extruder, the total extrusion time from addition of the dough premix until extrusion through the die preferably is adjusted to be from about 1 minute to about 10 minutes, and more preferably from about 2 minutes to about 9 minutes. Generally, the temperature is controlled between about 40° F. and about 145° F., preferably between about 60° F. and about 130° F., and more preferably between about 70° F. and about 125° F.

As noted above, the extruder can be equipped with a filling pump, such that dough reaching the die surrounds a filling and forms a coextrusion. Coextrusion is well known in the art. The relative amounts of filling and dough can be adjusted by the relative speed of the extruder screw and the flow rate of the filling. When a filling is used, a structure of dough surrounding filling exits from the die during the extrusion process. The shape and size of the extrudate of filling surrounded by dough depends on the shape and size of the die. The filled extrudate can be cut to a desired length. Once cut, the dough can be sealed at the ends to secure the filling within the dough.

The filling, if any, can be a raw or cooked food product. The filling and/or ingredients of the filling can be previously frozen and subsequently thawed and/or cooked. The filling can have a uniform consistency or a chunky consistency. In preferred embodiments, the filling is a highly viscous liquid, suspension or pseudoliquid, i.e., a flowable mixture of particulates and/or liquid that may not normally be a liquid or a suspension. The material preferably is highly viscous such that it will not flow immediately through any imperfection in a dough covering or out from the ends or seams of the product when cut and crimped after exiting the extruder.

The filling can be made from any type or types of food ingredients, including meat ingredients, vegetable ingredients, dairy ingredients, fruit ingredients, spices, flavorings, fats, and the like. The filling can further include, for example, preservatives and property modifiers, such as emulsifiers and thickening agents.

Food Products and Processing

As noted above, the extrusion process described herein is a "cold" or forming extrusion process, i.e., not a hot or cooking extrusion process. Thus, the starch of the flour preferably does not gel in the extrusion process. Following the extrusion and cutting of the dough, the raw dough or filled raw dough product generally is cooked prior to consumption. To complete the processing, the raw dough product can be cooked or partially cooked by baking, boiling, frying or microwave cooking the dough product after it exits the extruder. Rather than cooking the raw dough product immediately following the extrusion process or a controlled proofing step, the dough can be refrigerated or frozen prior to cooking.

After the product is cooked, it can be eaten, if desired, or stored. Storage generally involves refrigeration or freezing of the product. Refrigerated or frozen dough products can be stored for reasonable periods of time based on the storage temperatures. The refrigerated or frozen product can be reheated prior to eating, if desired.

During the distribution of a frozen dough product, the product can be subject to temporary temperature abuse that will result in the product experiencing one or more thawing and refreezing cycles. For conventional filled dough products with fillings having a high water activity, thawing of cooked dough can result in substantial losses of dough integrity. Thus, unleavened dough with a high water activity filling can become very soggy or limp after just one freeze/thaw cycle. In contrast, it has been found that the filled dough products formed from preferred extruded leavened dough have particularly desirable freeze/thaw properties. In particular, preferred cooked, extruded dough products generally can be frozen and thawed several times without causing substantial changes in dough properties following subsequent microwave reheating. Specifically, the textural properties of the cooked leavened dough, discussed above, preferably do not change significantly following several freeze/thaw cycles and subsequent microwave reheating. The freeze thaw stability of a frozen dough product generally is correlated with shelf life because gradual moisture migration during storage typically are affected by similar factors as the more drastic changes that take place upon freeze/thaw. Also, an evaluation of shelf life preferably accounts for some partial thawing that can be expected during normal transportation of the product from manufacturing to consumption.

It has been discovered that some of the products of the improved extrusion process, described herein, are particularly amenable to microwave reheating. Microwave cooking is a desirable approach from a consumer perspective due to convenience and speed. Microwave cooking can make dough products tough, as described in U.S. Pat. No. 5,035,904 to Huang et al, entitled "Starch-Based Products for Microwave Cooking or Heating," incorporated herein by reference. In particular, leavened, extruded doughs produced with small cells and little surface blistering do not become undesirably tough upon microwave cooking, as described further in the Examples below.

The frozen or refrigerated dough product can be packaged for distribution to the consumer. Any suitable packaging can be used including conventional packaging. The consumer generally reheats the dough product, by boiling, baking, frying or microwave heating the product.

EXAMPLES

Example 1—Timing of Carbon Dioxide Release

This example illustrates the timing of carbon dioxide release obtained with multiple leavener combinations using a small contained dough mixer.

A slurry was formed containing 83.20 weight percent water, 7.80 weight percent oil and 9.00 weight percent of a seasoning blend. For each sample, about 405 to about 410 g flour was mixed with leaveners. The quantities of leaveners are described below. The mixed dry ingredients and a 182.58 g portion of slurry were added to a one quart sigma mixer from Teledyne Read Co. (York, Pa.). The resulting dough contained less than about 1 percent each by weight sugar, salt and several other flavorings. Samples were formed with two different moisture contents. The higher moisture dough samples had an additional 18 grams of water.

Five different encapsulated bicarbonates were mixed with MCP to form five leavener combinations. Furthermore, six different leavening acids were mixed with sodium bicarbonate to form six additional leavener combinations. The eleven different leavener combinations are described more explicitly in Table 1, where percentages are relative to the total dough weight.

TABLE 1

| LEAVENER COMBINATION | SODA | WEIGHT % SODA | ACID | WEIGHT % ACID |
|---|---|---|---|---|
| 1 | BC70f | 0.85 | MCP | 0.75 |
| 2 | BC70c | 0.85 | MCP | 0.75 |

TABLE 1-continued

| LEAVENER COMBINATION | SODA | WEIGHT % SODA | ACID | WEIGHT % ACID |
|---|---|---|---|---|
| 3 | W50 | 1.20 | MCP | 0.75 |
| 4 | W70 | 0.85 | MCP | 0.75 |
| 5 | BC60 | 1.00 | MCP | 0.75 |
| 6 | SBC | 0.94 | MCP | 0.83 |
| 7 | SBC | 0.94 | AMCP | 0.80 |
| 8 | SBC | 0.94 | SAPP28 | 0.92 |
| 9 | SBC | 0.94 | SAPP40 | 0.92 |
| 10 | SBC | 0.94 | SALP/LL | 0.66 |
| 11 | SBC | 0.94 | SALP/POL | 0.66 |

BC70f = 70% encapsulated sodium bicarbonate, fine granule, from Balchem Corp., Slate Hill, NY
BC70c = 70% encapsulated sodium bicarbonate, coarse granule, from Balchem Corp.
W50 = 50% encapsulated sodium bicarbonate, from Watson Food Corp., Inc., West Haven, CT.
W70 = 70% encapsulated sodium bicarbonate, from Watson
BC60 = 60% encapsulated sodium bicarbonate, from Balchem
SBC = sodium bicarbonate
MCP = monocalcium phosphate
AMCP = anhydrous monocalcium phosphate
SALP/LL = SALP/Leaven Lite ®, Solutia, St. Louis, MO
SALP/POL = SALP/Pan-O-Lite ®, Solutia, St. Louis, MO These eleven different leavener combinations were used with two different water contents in the final dough to yield twenty-two different formulas. Each of the twenty-two different formulas was mixed at two different jacketed temperatures to yield forty-four samples.

The experimental setup is shown schematically in FIG. 3. The sigma mixer included a mixing container 200 and a motor 202. The temperature of mixing container 200 was controlled with a water bath 204 at a temperature of either 10° C. (50° F.) or 60° C. (140° F.) to mimic the temperature conditions in the premix (10° C.) and extruder barrel near the die (60° C.). A tank 206 of compressed $CO_2$-free gas was used to supply stripping gas to mixing container 200. The flow of gas from tank 206 was controlled with a regulator 208. Gas from mixing container 200 flowed through a filter 210 to a Li-Cor Model LI-6262 $CO_2$ detector 212 (Li-Cor, Inc., Lincoln, Nebr.). The $CO_2$ detector was interfaced with a personal computer 214 for data analysis. The mixing time was measured to correspond to possible points in the extrusion process.

To perform the measurements, the lid of the mixer was sealed, and stripping gas was turned on to flush the gas within the mixer. The carbon dioxide released into the mixer headspace was conveyed to the $CO_2$ analyzer. As mixing continued, a $CO_2$ release profile was registered on the $CO_2$ analyzer and subsequently stored on the computer.

The resulting $CO_2$ release measurements are depicted in FIGS. 4A–E for the samples with encapsulated sodas and MCP and in FIGS. 5A–F for the samples with unencapsulated sodium bicarbonate and various leavening acids. The lines marked HT correspond to the measurements at 140° F. (60° C.), and the lines marked LT correspond to the measurements at 50° F. (10° C.). Similarly, lines marked AW have additional water in the dough, as described above. Two samples with leavener 9 were ran in duplicate, with both curves shown in FIG. 5D.

These results showed that the variation of $CO_2$ releasing rates of various leavening soda and acids are not only determined by their chemical composition but also are affected by temperature and moisture levels. Variations due to chemical composition, temperature and moisture level allowed the selection of various combinations to provide satisfactory performance for the extrusion applications. In one preferred embodiment, $CO_2$ release is spread through the extrusion process. Part of the $CO_2$ is designed for release in the premixing stage, a portion of the $CO_2$ is released in the barrel and the remaining $CO_2$ is released in the cooking process.

Example 2—Extrusion Experiments

This example demonstrates the successful production of the leavened dough product and cooking of the resulting leavened dough product. Doughs with six different leavening systems were examined against one unleavened dough.

To prepare the unleavened control dough sample (D1), a slurry was prepared as described in Example 1, above. Then, 69.6 weight percent flour was mixed with 30.4 weight percent slurry to form the dough.

Six leavened dough samples (D2–D7) were prepared. Each sample included about 30.4 weight percent slurry and 69.6 weight percent flour blend. Five of the leavened samples (D2–D6) were prepared with the slurry as described in Example 1. Leavened sample D7 was prepared with a second slurry. The second slurry was formed with 81.9 weight percent water, 11.8 weight percent seasoning and 6.3 weight percent soy oil. Also, leavened sample D7 was formed from a flour blend with 95.0 weight percent flour, 1.7 weight percent powdered shortening, and leavener.

The leaveners used in the leavened samples are summarized in Table 2.

TABLE 2

|    | Weight % SBC | Weight % acid | Leavening Acid |
|----|--------------|---------------|----------------|
| D2 | 0.60 | 0.79 | AB |
| D3 | 1.10 | 0.05 | AB |
| D4 | 1.50 | 0.65 | AB |
| D5 | 0.36 | 1.50 | AB |
| D6 | 0.66 | 2.30 | AB |
| D7 | 1.11 | 1.11 | SALP |

SBC = sodium bicarbonate
AB = an acid blend of 69.0 weight percent SAPP, 19.2 weight percent AMCP and 11.8 weight percent SALP/LL The leaveners in samples D3–D6 included different combinations of acids and sodas to yield particular characteristics of the leavener. In particular, the four samples were formulated to have the following characteristics: (D3) low gas, high pH, (D4) high gas, low pH, (D5) low gas, low pH, (D6) high gas, low pH.

The flour blend and the slurry were continuously metered to the premixer that had a residence time of about 2 minutes. The dough premix was continuously fed into a DeMaco Brand single screw extruder (DeFrancisci Machine Corp., Brooklyn, N.Y.) with a standard screw design. An annulus die with a 1.15 inch inner diameter and 1.20 inch outer diameter, yielding a 0.05 inch thick annular opening, was used with the extruder, except as described below. The products were all filled with a tomato based filling or a fruit based filling following extrusion. The dough to filling weight ratio was about 1:1.

The process conditions used to extrude the dough are provided in Table 3.

TABLE 3

| SAMPLE | PRESSURE PSIG | TEMP. deg. F | EXTRUSION Rate g/15 sec |
|--------|---------------|--------------|-------------------------|
| D1 | 971.0 | 102.0 | 288.3 |
| D2-1 | 1007.0 | 100.0 | 287.0 |
| D2-2 | 930.0 | 102.5 | 469.4 |
| D3 | 1180.0 | 102.1 | 277.3 |
| D4 | 1280.0 | 102.9 | 279.6 |
| D5 | 730.0 | 83.4 | 272.0 |
| D6 | 1085.0 | 86.4 | 296.8 |
| D7 | 1028.0 | 91.0 | 283.4 |

D2-1 = 1.15 inch inner diameter die with a 0.05 inch annular opening
D2-2 = 1.15 inch inner diameter die with a 0.1 inch annular opening Following extrusion, the pH and density of the dough were measured. The measurements are presented in Table 4.

TABLE 4

| SAMPLE | DENSITY g/cc | pH |
|--------|--------------|-----|
| D1 | 1.26 | 5.88 |
| D2-1 | 1.04 | 6.92 |
| D2-2 | 1.03 | 6.76 |
| D3 | 1.17 | 8.24 |
| D4 | 1.18 | 7.44 |
| D5 | 1.15 | 6.05 |
| D6 | 1.12 | 6.16 |
| D7 | 1.16 | 7.79 |

Filled samples D2 had a more expanded and tender crust after microwave reheating compared with filled samples D7, which were drier and more brittle. Samples D3 had very little carbon dioxide production with very little observable leavening effect. Samples D3 was similar to samples D7 in terms of degree of expansion. Samples D4 was very brittle following extrusion. Samples D5 appeared dense and was somewhat more difficult to handle upon extrusion, being too fragile. Sample D6 was similar in fluffiness to sample D2. The evidence suggests that the pH is a cofactor in dough development. Also, the gas amount significantly affected dough development and overall texture.

Samples D3–D6 were cooked using a variety of approaches. Representative filled products of each sample were directly fried. Others were proofed for about 10 minutes at room temperature under high relative humidity (85–90%) prior to either steam baking or frying. Other representative samples of each type were dipped in boiling water for five seconds prior to steam baking or frying. The steam baking resulted in a surface appearance similar to that of a steamed bread surface with a bready interior. After frying the samples had a rough surface with a crisp texture that remained crisp after microwave reheating or reheating in an oven.

Example 3—Different Leavening Acids

Five different leaveners were evaluated in the tests reported in this example.

The samples were prepared similarly to the first leavened sample (D2) of Example 2. The leavener in the flour blend was selected from the five different leaveners. The composition of the leaveners is presented in Table 5.

TABLE 5

|   | Acid | % of Flour Blend | Base | % of Flour Blend |
|---|---|---|---|---|
| 1 | AMCP | 1.186 | SBC | 0.949 |
| 2 | SAPP28 | 1.318 | SBC | 0.949 |
| 3 | SAPP40 | 1.318 | SBC | 0.949 |
| 4 | LB | 2.496 | SBC | 1.898 |
| 5 | GDL | 1.887 | E-Soda | 1.11 |

LB = leavener blend, 69.0 weight percent SAPP 40, 19.2 weight percent AMCP and 11.8 weight percent SALP.
E-Soda = 85% encapsulated sodium bicarbonate from Balchem.

Each type of leavener was used to make two types of samples with different amounts of water added at the connection port between the premixer and the extruder. In particular, samples with higher water content had 2.5 weight percent additional water, as indicated in the sample labels with a "+".

The premix was prepared in a premixer and fed into the DeMaco extruder, described in Example 2. Runs were performed with one type of sample using a die with either a 0.05 inch diameter annular opening or a 0.100 inch diameter annular opening. Lower pressure was observed with the die having a 0.100 inch annular opening. Following extrusion, the dough samples had density and pH measurements as specified in Table 6.

TABLE 6

| SAMPLE | DENSITY (g/cc) | pH |
|---|---|---|
| AMCP-1 | 1.10 | 6.71 |
| AMCP-1+ | 1.16 | 6.75 |
| SAPP28-1 | 0.96 | 6.76 |
| SAPP28-1+ | 1.03 | 6.73 |
| SAPP28-2 | 1.07 | 6.56 |
| SAPP28-2+ | 1.08 | 6.70 |
| SAPP40-1 | 1.21 | 6.70 |
| SAPP40-1+ | 1.12 | 6.71 |
| SAPP40-2 | 1.09 | 6.66 |
| SAPP40-2+ | 1.10 | 6.70 |
| GDL-1 | 0.83 | 6.62 |
| GDL-1+ | 0.97 | 6.64 |
| LB-1 | 1.06 | 7.34 |
| LB-1+ | 1.15 | 7.69 |
| LB-2 | 1.06 | 6.89 |

"1" indicates extrusion with a 0.1 inch diameter annular die
"2" indicates extrusion with a 0.05 inch diameter annular die After extrusion, samples formed with leaveners 1–5 of Table 5 were examined to evaluate how much carbon dioxide is released following the extrusion process. Plots of carbon dioxide release following extrusion for the five leaveners are shown in FIGS. 6A–E. The individual curves are marked to indicate if a 0.10 inch diameter annular die or a 0.05 inch diameter annular die were used. The curves are also marked with a "+" if the sample contained added water.

All of extruded dough samples were fried. Dough thickness before and after frying are listed in Table 7.

TABLE 7

| SAMPLE | Ave. Raw Dough Thickness (0.1 mm) | Ave. Fried Dough Thickness (0.1 mm) | Ratio |
|---|---|---|---|
| AMPC-1 | 21 | 31 | 1.48 |
| AMPC-1+ | 8.75 | 12.5 | 1.43 |
| SAPP28-1 | 27 | 39.2 | 1.45 |
| SAPP28-1+ | 28.25 | 43.0 | 1.52 |
| SAPP28-2 | 11 | 13.6 | 1.24 |
| SAPP28-2+ | 12 | 17.2 | 1.43 |
| SAPP40-1 | 29 | 33.7 | 1.16 |
| SAPP40-1+ | 28.5 | 36.4 | 1.28 |
| SAPP40-2 | 10.25 | 11.6 | 1.13 |
| SAPP40-2+ | 11.5 | 15.7 | 1.36 |
| GDL-1 | 29.5 | 39.1 | 1.33 |
| GDL-1+ | 31.8 | 45.5 | 1.43 |
| GDL-2 | 10.25 | 11.0 | 1.07 |
| LB-1 | 10 | 10.5 | 1.05 |
| LB-1+ | 10.75 | 14.75 | 1.37 |

Individual leavening acids did not provide product quality as good as obtained with leavening acid blends described in Example 2. With the LB leavener, which had double the leavener of sample D2 of Example 2, doubling the amount of the leavening acid blend provided good results but no significant change in dough volume. Again, the relative independence of the dough volume on the amount of leavener may be a result of the relatively un-developed dough produced by the single screw extruder.

The dough samples were also used to coextrude filled dough products. The filled dough samples were examined following frying. Fried filled dough products produced with SAPP28 leavening acid had more, small cells, a bready texture and few surface blisters. AMCP yielded fewer, larger cells and a chewier final product. SAPP40, with a $CO_2$ release rate between the rates for SAPP 28 and AMCP, yielded fewer, larger cells than obtained with SAPP28 and more, smaller cells than obtained with AMCP. SAPP40 yielded a dough that was more chewy than obtained with SAPP28 and less chewy than obtained with AMCP. GDL with encapsulated soda yielded a dough with a tougher and chewier texture and more surface blisters, but with more dough expansion.

Less dough development and a tender product results from an acid controlled leavening system having a dough mixture pH changing from high to low due to the leavening reaction. More dough development and a chewier product results from a soda controlled leavening system having a dough mixture pH changing from low to high during the extrusion process. It is believed that pH profiles during extrusion significantly affect dough development and texture of the final product. A multistep release can be obtained with a blend of leavening acids in the dough.

Example 4—Processing Parameters

This example explores the effects of several processing parameters with four different leavening systems.

Two different dough formulations were tested each with two leavening systems. The two dough formulations used the slurry formula described in Example 1. The first formulation was prepared with a flour preblend containing 97.8 weight percent flour, 1.25 weight percent leavening acid mixture and 0.95 weight percent sodium bicarbonate. To make the dough, 69.6 weight percent flour preblend was mixed with 30.4 weight percent liquid slurry. Two doughs were produced with the first dough formulation. The first dough (D1) had a leavening acid mixture of 69.1 weight percent SAPP28, 19.1 weight percent AMCP and 11.7 weight percent SALP. The second dough (D2) has a leavening acid mixture of 69.1 weight percent SAPP40, 19.1 weight percent AMCP and 11.7 weight percent SALP.

The second dough formulation was formed with a flour preblend with 97.4 weight percent flour, 1.4 weight percent encapsulated sodium bicarbonate and 1.3 weight percent MCP. A third dough (D3) was produced with the second dough formulation where the encapsulated sodium bicarbonate was 70% Watson e-soda. Also, a fourth dough (D4) was produced with the second dough formulation where the encapsulated sodium bicarbonate was Balchem 70% e-soda. For each of the four doughs, a version was produced with additional water. These versions are indicated as D1+–D4+.

Control doughs were also formed. The first control dough (C1) had the same ingredients as the first dough formulation described above except that the leavener was left out. Another control (C2+) with additional water also was made for comparison. The doughs were extruded on the DeMaco single screw extruder described above. The properties of the extrusion process are summarized in Table 8. The samples with additional water are indicated with a plus.

TABLE 8

| SAMPLE | Dens. (g/ml) | Temp. (° F.) | Die Pres. (psi) | Rate (lb./min.) |
|---|---|---|---|---|
| C1 | 1.17 | 99 | 1200 | 2.81 |
| C2+ | 1.21 | 105 | 850 | 2.08 |
| D1 | 0.96 | 98 | 1030 | 2.60 |
| D1+ | 0.99 | 97 | 600 | 1.70 |
| D2 | 1.01 | 97 | 1170 | 2.69 |
| D2+ | 0.99 | 101 | 750 | — |
| D3 | 1.17 | 98 | 1010 | 2.81 |
| D3+ | 1.11 | 97 | 750 | 1.97 |
| D4 | 1.06 | 97 | 1100 | 2.27 |
| D4+ | 1.03 | 99 | 790 | 2.67 |

The presence of additional water had a significant effect on die pressure and extrusion rate. The presence of additional water had less of an impact on extrusion temperature. The temperatures are elevated relative to room temperature due to heat generated by shearing within the extruder.

Following extrusion each of the dough types was examined for dough properties with representative samples of each type being cooked by frying and subsequent microwave reheating. Doughs 1 and 2 had a desirable texture and had a lighter density than doughs 3 and 4. All of the leavened products, except dough D3, had lighter densities than control dough and improved properties following microwave reheating relative to unleavened doughs. The D3 dough had very slow release of $CO_2$. The desirable characteristics of doughs 1 and 2 included a more bready texture, a fuller appearance, a golden brown color following cooking, freeze/thaw stability after 4 cycles, and a tender and bready texture after frying and microwave reheating. Doughs 1 and 2 performed better with microwave reheating compared with the control samples, while they performed comparably when reheated in a conventional oven.

The raw and cooked, non-filled samples were tested for oil content and moisture content. The results are presented in Table 9.

TABLE 9

| | RAW DOUGH | FRIED DOUGH | |
|---|---|---|---|
| SAMPLE | Moisture % | Moisture % | Fat % |
| C1 | 31.7 | 30.93 | 7.24 |
| C2 | 32.59 | 31.35 | 5.79 |
| D1 | 32.1 | 28.11 | 11.83 |
| D1+ | 34.18 | 30.47 | 12.08 |
| D1a | — | 29.77 | 10.76 |
| D1+a | — | 31.88 | 11.11 |
| D2 | 32.16 | 27.85 | 10.83 |
| D2+ | 34.22 | 29.54 | 10.59 |
| D2a | — | 29.76 | 9.76 |
| D2+a | — | 30.61 | 10.76 |
| D3 | 31.24 | 30.09 | 12.02 |
| D3+ | 33.88 | 31.11 | 12.27 |
| D3a | — | 29.14 | 12.81 |
| D4 | 32.21 | 30.41 | 10.81 |
| D4+ | 34.93 | 31.29 | 11.45 |
| D4a | — | 30.73 | 10.18 |
| D4+a | — | 32.13 | 11.27 |

"a" indicated that the samples were allowed to proof prior to cooking.

These results indicate that the leavened products had a relatively high oil uptake. The products, however, were perceived as less greasy.

Figure 7:
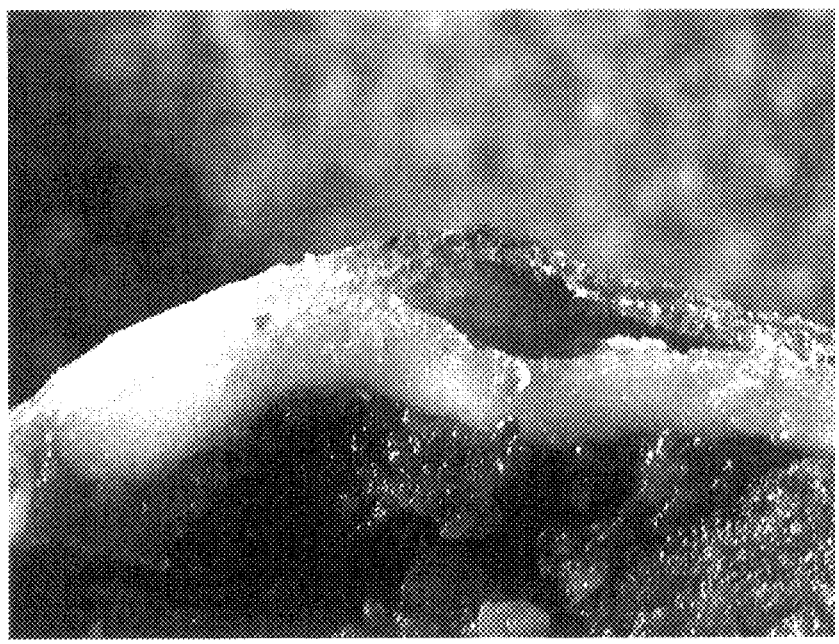
FIG. 7 is a photograph of a filled dough product after frying formed with an unleavened, extruded dough.
Figure 8:
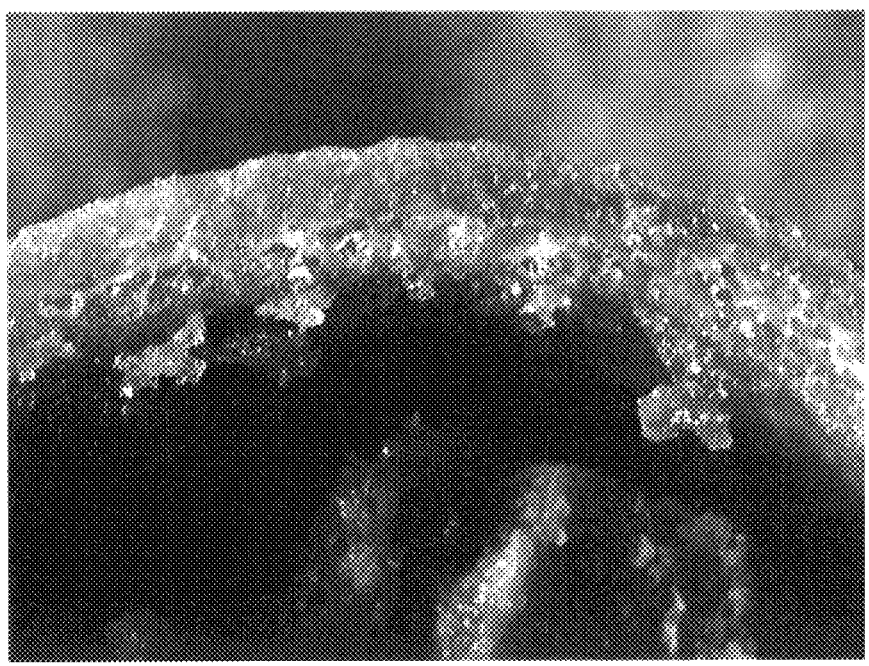
FIG. 8 is a photograph of a filled dough product after frying formed with a leavened, extruded dough.

Representative, filled dough products with an unleavened, control dough and leavened dough D1 were cut open after frying and photographed. These are presented in FIG. 7 (control dough) and 8 (leavened dough D1). The control dough has a very thick gummy layer next to a thin crust at the surface of the dough. A very large blister can be seem in the control dough. The leavened dough in FIG. 8 has no blistering and a uniform cell structure through the dough. At most, the leavened dough has a very small gummy layer immediately adjacent the filling that is lining a thick, tender crust.

Example 5—Panel Evaluation

This example evaluates the qualities of cooked and reheated dough samples, as evaluated by a panel of experts, all experienced in the rating process.

Four leavened dough samples and one unleavened dough samples were used in the study for a total of six doughs. The first control sample (1) was prepared identically as the first unleavened dough sample (D1) of Example 2. The first leavened dough sample (2) was prepared identically to the first leavened dough sample (D2) of Example 2. The second leavened dough sample (3) was prepared identically except for the addition of 2.5 weight percent of additional water during introduction of the premix into the extruder barrel. The third leavened dough sample (4) was prepared identically to the third dough sample (D3) of Example 4. The fourth leavened dough sample (5) was prepared identically to the fourth dough sample except for the addition of 2.5 weight percent of additional water.

Following extrusion, all of the samples were deep fried and then frozen. Half of the sample were subjected to four freeze/thaw cycles. Then, the samples were reheated by baking or microwave reheating. Each leavened dough sample was compared with microwave or baked reheated control samples. On a scale of 0 to 60, the results of the panel analysis for the microwaved leavened samples are summarized in Table 10, while the results of the panel analysis for the baked reheated leavened samples are summarized in Table 11.

TABLE 10

Microwave Reheated Leavened Samples

|  | 1 | 2 | 3 | 4 | 5 | 6 | 7 | 8 |
|---|---|---|---|---|---|---|---|---|
| Crust Color | 36 | 35 | 26 | 25 | 24 | 22 | 21 | 21 |
| Greasiness | 32 | 36 | 19 | 20 | 18 | 22 | 29 | 21 |
| Cell Structure | 15 | 15 | 28 | 30 | 29 | 25 | 26 | 24 |
| Toughness | 36 | 43 | 23 | 22 | 21 | 29 | 22 | 27 |
| Surface Blisters | 48 | 45 | 7 | 7 | 7 | 7 | 7 | 7 |
| Oily Taste | 22 | 25 | 17 | 16 | 16 | 15 | 17 | 18 |
| Crispness | 33 | 10 | 13 | 11 | 13 | 13 | 9 | 10 |
| Translucence | 22 | 25 | 8 | 9 | 9 | 9 | 11 | 12 |
| Off-Flavor | 6 | 7 | 7 | 7 | 7 | 7 | 9 | 7 |
| Over-all Appeal | 33 | 20 | 30 | 28 | 29 | 28 | 23 | 28 |

1 = Baked Control
2 = Microwaved Control
3 = Dough (2), no freeze/thaw
4 = Dough (2) after 4 freeze/thaw cycles
5 = Dough (3)
6 = Dough (4), no freeze/thaw
7 = Dough (4) after 4 freeze/thaw cycles
8 = Dough (5)

TABLE 11

Baked Reheated Leavened Samples

|  | 1 | 3 | 4 | 5 | 6 | 7 | 8 |
|---|---|---|---|---|---|---|---|
| Crust Color | 32 | 35 | 38 | 30 | 28 | 27 | 36 |
| Greasiness | 30 | 11 | 12 | 12 | 14 | 16 | 18 |
| Cell Structure | 13 | 32 | 31 | 33 | 28 | 29 | 30 |
| Toughness | 36 | 29 | 23 | 31 | 33 | 24 | 31 |
| Surface Blisters | 49 | 5 | 5 | 5 | 5 | 6 | 12 |
| Oily Taste | 21 | 16 | 18 | 16 | 16 | 19 | 18 |
| Crispness | 26 | 24 | 22 | 22 | 23 | 20 | 26 |
| Translucence | 27 | 8 | 9 | 8 | 11 | 13 | 14 |
| Off-Flavor | 10 | 12 | 15 | 14 | 11 | 13 | 10 |
| Overall Appeal | 25 | 29 | 28 | 24 | 27 | 28 | 31 |

In comparing the microwaved leavened dough products with the controls, the controls had a darker color. Doughs (2) and (3) were less greasy in appearance than the others and had larger cells. The leavened doughs were significantly more tender than the control doughs. Only the control doughs had surface blisters. The control doughs had a much oilier taste than the leavened doughs. Only the baked control dough was crisp, but the controls consistently had a more translucent look whether baked or microwaved. None of the doughs had a significant off-flavor. Overall, the microwaved leavened doughs were comparable to the baked unleavened dough in appeal.

In comparing the baked leavened dough products with the baked control, the baked leavened dough products browned to roughly match the control. Again, the control was much greasier in appearance. All of the leavened doughs had a visibly larger internal cell structure than that of the control, and the leavened doughs were more tender. The control formed surface blisters, although dough (5) was starting to form blisters also. The control tasted a little more oily, and the control was considerably more translucent. Some of the leavened doughs had a slight off-flavor. Overall, the leavened doughs had as much or more appeal as the baked control.

Example 6—Evaluation of Carbon Dioxide Release During Extrusion Process

In this example, the release of carbon dioxide is examined for 5 different leavening systems. The doughs were extruded on the DeMaco single screw extruder described above, with a 0.05 inch die. As described below, some of the chemical leaveners were added to the liquid slurry while others were added to the dry mix.

The first dough sample (1) was a control that was prepared identically to the unleavened dough sample (D1) of Example 2. The second dough sample (2) was prepared identically to the first dough sample (1) except for the addition of SALP and sodium bicarbonate to the agitated liquid slurry in an amount such that the final dough had 0.25 percent by weight of each leavener. The third sample (3) was prepared identically to second dough sample (2) except that the final dough included SALP and sodium bicarbonate in an amount of 1.5 percent by weight of each leavener. The fourth dough sample (4) was prepared identically to the second leavened dough sample (D2) of Example 4. The fifth sample (5) was prepared identically to the first dough sample (1) except for the addition to the flour preblend of a stoichiometric mixture of SALP and sodium bicarbonate such that the final dough included 0.3 percent by weight of each leavener.

The samples were mixed using a premixer and delivered into the DeMaco extruder. The agitated slurry generally was held for about 8 minutes prior to sampling. A run generally lasted for about 13 minutes. Portions of each dough sample were extruded with a Pizza Rolls® snack type high water activity filling. The pH of each sample was measured at the beginning of the premix, at the end of the premix and after the die in the extrudate. The pH measurements are presented in Table 12.

TABLE 12

| Sample | Start of premix | End of premix | Extrudate |
|---|---|---|---|
| 1 | — | — | 5.8 |
| 2 | 7.7 | 7.5 | 7 |
| 3 | 8.6 | 8.7 | 8.2 |
| 4 | 6.9 | 6.9 | 7.0 |
| 5 | 7.0 | 7.2 | 6.9 |

The results in Table 12 indicate that addition of the leaveners to the slurry resulted in significantly higher initial pH values. The initial pH results may be influenced by the high solubility of the soda and the low solubility of SALP. Tests indicate that the SALP takes about fifteen to twenty minutes to begin reacting with soda in a water solution without agitation, but much more quickly with agitation. For all of the samples, the leavened dough had a significantly higher pH than the unleavened dough.

To evaluate the rate of carbon dioxide release, 100 gram portions of dough premix and extruded dough were obtained, respectively, from the end of the premixer near the exit of the premixer and after the extruder die. These portions were placed in a risograph, Model 1260PC from R Design, Pullman, Wash. The risograph measures the volume of gas released from the dough or dough premix after it is placed in the risograph. Risograph measurements were conducted at 30° C.

Using the theoretical total carbon dioxide production and the risograph measurements, the total volume of carbon dioxide released prior to the extruder, prior to the die and within the extruder are calculated. The volume of gas measured for sample 1, the control, are subtracted from the other measurements to establish a base line. For samples 2 and 3, the amount of gas released in the slurry was not measured. The results are presented in Table 13.

TABLE 13

| | CO₂ Release (mls) | | | | |
|---|---|---|---|---|---|
| Sample | total CO2 | in premix | in extrudate | before premix | before die | in extruder |
| 1 | 0.0 | N/A | N/A | N/A | N/A | N/A |
| 2 | 66.7 | 26.1 | 20.6 | 40.6 | 46.1 | 5.5 |
| 3 | 400.0 | 386.4 | 353.7 | 13.6 | 46.3 | 32.7 |
| 4 | 176.0 | 90.6 | 74.6 | 85.4 | 101.4 | 16.0 |
| 5 | 80.0 | 44.4 | 40.7 | 35.6 | 39.3 | 3.7 |

Figure 9:
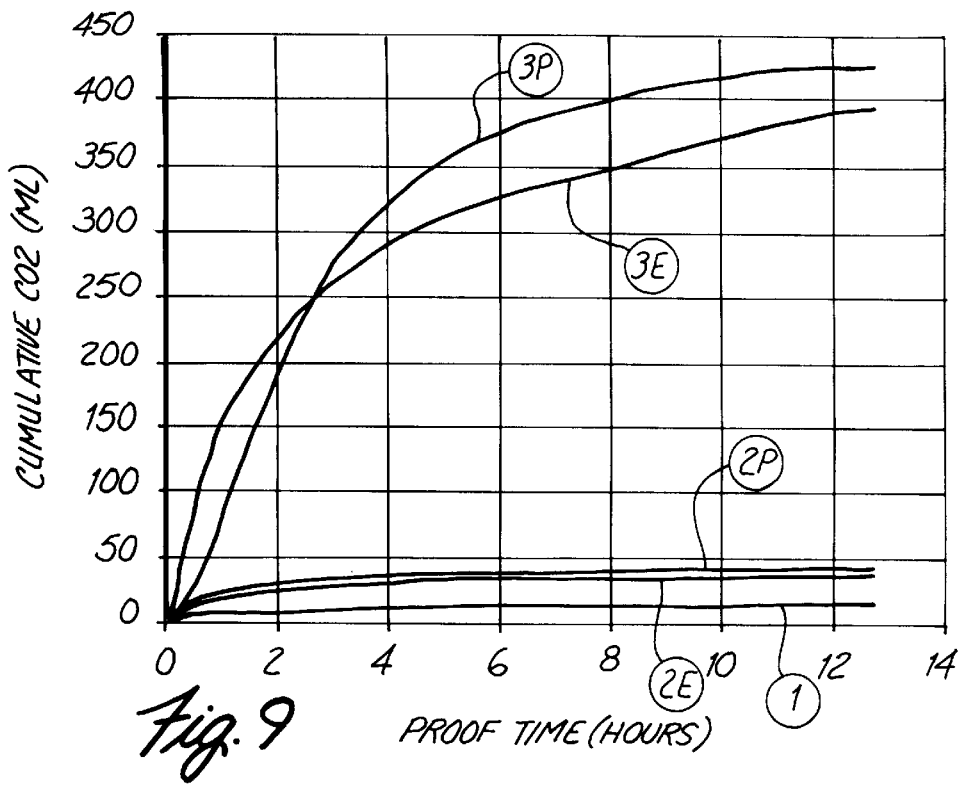
FIG. 9 is a plot of carbon dioxide release measured with a risograph during a proofing step for a control dough, two extruded samples following extrusion and for two premix samples.
Figure 10:
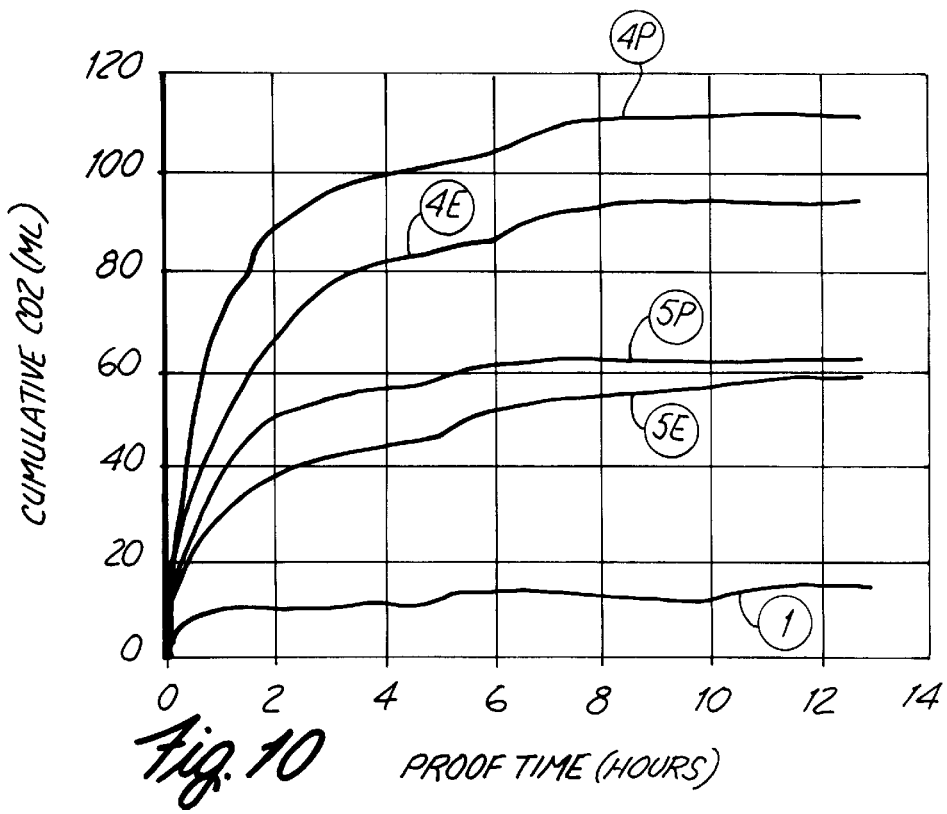
FIG. 10 is a plot of carbon dioxide release measured with a risograph during a proofing step for a control dough, two additional extruded samples following extrusion and for two additional premix samples.

The time evolution of the gas release in the risograph are plotted in FIGS. 9 and 10, with extrudate samples marked with an E and premix samples marked with a P. Note that the graphs in FIGS. 9 and 10 have different y-axis scale.

The density, moisture content and fat content were measured for the dough following extrusion. The results are presented in Table 14.

TABLE 14

| Sample | Dough Density (g/cc) | Moisture (%) | FAT (%) |
|---|---|---|---|
| 1 | 1.33 | 30.82 | 2.64 |
| 2 | 1.33 | 30.77 | 2.93 |
| 3 | 1.22 | 32.31 | 2.77 |
| 4 | 1.06 | 30.44 | 2.31 |
| 5 | 1.24 | — | — |

A portion of the dough samples, both filled and unfilled, were also fried. The moisture content and fat content of the fried dough was measured, and the results are presented in Table 15.

TABLE 15

| | Moisture (%) | | Fat (%) | |
|---|---|---|---|---|
| Sample | Empty Crust | Crust-Filled Product | Empty Crust | Crust-Filled Product |
| 1 | 14.64 | 35.78 | 13.26 | 10.45 |
| 2 | 14.97 | 36.42 | 13.01 | 10.33 |
| 3 | 9.41 | 31.79 | 16.37 | 13.85 |
| 4 | 17.45 | 32.90 | 13.16 | 10.81 |
| 5 | 22.68 | 30.58 | 8.73 | 7.77 |

The dough structure of the cooked samples was also examined. The cooked dough of samples 1, 2 and 5 had similar cell structure within the dough. Sample 3 had a larger number of smaller cells, and sample 4 had even bigger cells. This observation is consistent with the data in other examples indicating that slower acids yield smaller cells and more tender products.

On a scale of 0 to 60, the results of a panel analysis of the samples after microwave reheating are summarized in Table 16.

TABLE 16

| | 1 | 2 | 3 | 4 | 5 |
|---|---|---|---|---|---|
| Crust Color | 28 | 22 | 45 | 22 | 29 |
| Greasiness | 31 | 32 | 24 | 24 | 27 |
| Cell Structure | 19 | 18 | 25 | 29 | 25 |
| Toughness | 29 | 25 | 10 | 20 | 22 |
| Oily Taste | 28 | 29 | 18 | 18 | 23 |

TABLE 16-continued

| | 1 | 2 | 3 | 4 | 5 |
|---|---|---|---|---|---|
| Crispness | 8 | 8 | 10 | 13 | 10 |
| Off-Flavor | 5 | 7 | 9 | 9 | 13 |
| Overall Appeal | 20 | 15 | 28 | 24 | 18 |

Runs 3 and 4 obtained the best overall scores.

The embodiments described above are intended to be illustrative and not limiting. Additional embodiments are within the claims below. Although the present invention has been described with reference to preferred embodiments, workers skilled in the art will recognize that changes may be made in form and detail without departing from the spirit and scope of the invention.

What is claimed is:

1. A method of forming a leavened dough product comprising extruding a mixture comprising flour, water and chemical leavener, the chemical leavener comprising a leavening acid and a salt having an anion selected from the group consisting of carbonate and bicarbonate, the extrusion temperature being less than about 145° F. (62.8° C.), the chemical leavener releasing sufficient carbon dioxide from the formation of the mixture through the extrusion to decrease the density of the extruded dough by at least about 5 percent relative to the corresponding extruded dough without the chemical leavener.

2. The method of claim 1 wherein the extrusion temperature is from about 60° F. to about 130° F.

3. The method of claim 1 wherein the extrusion temperature is from about 70° F. to about 125° F.

4. The method of claim 1 wherein the dough mixture initially comprises a mixture of leavening acids.

5. The method of claim 1 wherein the flour and chemical leaveners are introduced into the extruder separately from the water.

6. The method of claim 1 wherein the mixture is formed in a premixer before being introduced into the extruder.

7. The method of claim 6 wherein the mixture remains in the premixer for no more than about 8 minutes.

8. The method of claim 1 wherein the extrusion is performed in a single screw extruder.

9. The method of claim 1 wherein the extrusion is performed in an extruder that comprises more than one screw.

10. The method of claim 1 wherein the dough further comprises between about 1 percent and 35 percent fat.

11. The method of claim 1 wherein the mixture comprises less than about 10 percent by weight active leavener.

12. The method of claim 1 wherein the mixture comprises from about 0.1 to about 6 percent by weight active leavener.

13. The method of claim 1 wherein at least one leavener component is encapsulated.

14. The method of claim 1 wherein the leavening acid is selected from the group consisting of citric acid, sodium acid pyrophosphate (SAPP), sodium aluminum phosphate (SALP), monocalcium phosphate (MCP), dicalcium phosphate (DCP), sodium aluminum sulfate (SAS), anhydrous monocalcium phosphate (AMCP), dimagnesium phosphate (DMP), dicalcium phosphate dihydrate (DCPD), glucono delta lactone (GDL) and mixtures thereof.

15. The method of claim 1 wherein the extruded dough has a density less than about 1.12 g/cc.

16. The method of claim 1 wherein the extruded dough has a density from about 0.5 g/cc to about 1.05 g/cc.

17. The method of claim 1 wherein at least about 5 ml of carbon dioxide is released per 100 grams dough within the extruder.

18. The method of claim 1 wherein at least about 10 ml of carbon dioxide is released per 100 grams dough within the extruder.

19. The method of claim 1 wherein the chemical leavener releases sufficient carbon dioxide from the formation of the mixture through the extrusion to decrease the density of the extruded dough by at least about 10 percent relative to the corresponding extruded dough without the chemical leavener.

20. The method of claim 1 wherein the chemical leavener release sufficient carbon dioxide from the formation of the mixture through the extrusion to decrease the density of the extruded dough by at least about 15 percent relative to the corresponding extruded dough without the chemical leavener.

21. The method of claim 1 wherein the dough is coextruded with a filling to form a filled extruded dough product.

22. The method of claim 21 further comprising frying the filled extruded dough product, wherein the fried dough product has a dough with an inner, dense high moisture layer that extends through no more than about 25 percent of the thickness of the cooked dough.

23. The method of claim 21 wherein the extruded raw dough has a thickness from about 0.03 inch to about 0.25 inch.

24. The method of claim 1 wherein the flour and chemical leaveners are blended to form a dry blend and wherein the dry blend is mixed with the water to form the mixture.

25. The method of claim 1 wherein the density of the extruded dough is measured following a proofing period of at least about 5 minutes after extrusion of the dough.

26. A method of forming a leavened dough product comprising extruding a mixture comprising flour, water and chemical leavener, the leavener comprising a leavening acid and a salt having an anion selected from the group consisting of carbonate and bicarbonate, the extrusion temperature being less than about 145° F. (62.8° C.), the extruded uncooked dough having a density less than about 1.12 g/cc.

27. The method of claim 26 wherein the extruded uncooked dough has a density less than about 1.05 g/cc.

28. The method of claim 26 wherein the extruded uncooked dough has a density from about 0.5 g/cc to about 1.0 g/cc.

29. A method of forming a leavened dough product comprising:

forming a mixture comprising flour and a chemical leavener, the leavener comprising a leavening acid and a salt having an anion selected from the group consisting of carbonate and bicarbonate;

combining the mixture with an aqueous liquid to form a premix; and extruding the premix to form a dough product at a temperature that does not ause substantial gelatinization of the dough product.

30. The method of claim 29 wherein the premix is formed in a premixer.

31. The method of claim 29 wherein the premix is formed within an extruder.

* * * * *

UNITED STATES PATENT AND TRADEMARK OFFICE
CERTIFICATE OF CORRECTION

PATENT NO. : 6,180,151 B1
DATED : January 30, 2001
INVENTOR(S) : Geng et al.

It is certified that error appears in the above-identified patent and that said Letters Patent is hereby corrected as shown below:

<u>Column 26,</u>
Line 24, delete the word "ause" and replace it with -- cause --.

Signed and Sealed this

Ninth Day of October, 2001

Attest:

*Nicholas P. Godici*

NICHOLAS P. GODICI
*Attesting Officer*  *Acting Director of the United States Patent and Trademark Office*